(12) United States Patent
Zhao

(10) Patent No.: US 8,687,064 B2
(45) Date of Patent: Apr. 1, 2014

(54) METHOD AND DEVICE FOR DESCRIBING AND CAPTURING VIDEO OBJECT

(75) Inventor: Guangyao Zhao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 1095 days.

(21) Appl. No.: 12/698,677

(22) Filed: Feb. 2, 2010

(65) Prior Publication Data

US 2010/0142914 A1   Jun. 10, 2010

Related U.S. Application Data

(63) Continuation of application No. PCT/CN2008/072779, filed on Oct. 22, 2008.

(30) Foreign Application Priority Data

Oct. 23, 2007 (CN) .......................... 2007 1 0165614

(51) Int. Cl.
*H04N 7/18* (2006.01)
(52) U.S. Cl.
USPC ........................................... 348/152; 348/143
(58) Field of Classification Search
None
See application file for complete search history.

(56) References Cited

U.S. PATENT DOCUMENTS

| | | | | |
|---|---|---|---|---|
| 5,684,715 A | * | 11/1997 | Palmer | 348/473 |
| 6,130,964 A | | 10/2000 | Marques et al. | |
| 6,678,413 B1 | * | 1/2004 | Liang et al. | 382/181 |
| 7,010,036 B1 | | 3/2006 | Mory | |
| 2002/0097893 A1 | * | 7/2002 | Lee et al. | 382/103 |

FOREIGN PATENT DOCUMENTS

| | | |
|---|---|---|
| CN | 1223056 A | 7/1999 |
| CN | 1293782 A | 5/2001 |
| CN | 1367616 A | 9/2002 |
| CN | 1120629 C | 9/2003 |
| CN | 1222897 C | 10/2005 |
| CN | 1851710 A | 10/2006 |
| WO | 2006/080654 A1 | 8/2006 |

OTHER PUBLICATIONS

Office Action issued in corresponding Chinese Patent Application No. 2007101656145; issued Dec. 18, 2009.
International Search Report issued in corresponding PCT Application No. PCT/CN2008/072779; mailed Feb. 12, 2009.
Office Action issued in corresponding Chinese Patent Application No. 2007101656145, mailed Dec. 18, 2009.
Written Opinion of the International Searching Authority issued in corresponding PCT Patent Application No. PCT/CN2008/072779, mailed Feb. 12, 2009.
Chinese Patent No. 101420595, issued on Nov. 21, 2012, granted in corresponding Chinese Patent Application No. 200710165614.5.

* cited by examiner

*Primary Examiner* — Mehrdad Dastouri
*Assistant Examiner* — Kristin Dobbs
(74) *Attorney, Agent, or Firm* — Brinks, Gilson & Lione

(57) ABSTRACT

A method and a device for describing and capturing video objects are provided in the embodiments of the present application, including: capturing video images to generate video sequences, generating a video object tracking sequence (OTS) according to the video sequences, and generating video object descriptors (ODs) according to the video OTS and video sequences. Therefore, in a generated video object tracking sequence (OTS), the video object region tracking number (TID) is used to capture and track video objects. This makes it unnecessary to create a video object descriptor (OD) for each video object on a frame-by-frame basis. Therefore, the quantity of video ODs is reduced, thereby suiting the application requirement for the intelligent video interaction and accelerating the search of the video materials.

12 Claims, 5 Drawing Sheets

METHOD AND DEVICE FOR DESCRIBING AND CAPTURING VIDEO OBJECT

CROSS REFERENCE TO RELATED APPLICATIONS

This application is a continuation of International Application No. PCT/CN2008/072779, filed on Oct. 22, 2008, which claims priority to Chinese Patent Application No. 200710165614.5, filed on Oct. 23, 2007, both of which are hereby incorporated by reference in their entireties.

FIELD OF THE APPLICATION

The present application relates to a video technology, and in particular, to a method and a device for describing and capturing video objects.

BACKGROUND

Through years of digitization development, the video surveillance technology has become network-based, and is playing a positive role in monitoring the production, e.g. the production line, and the security, e.g. security in railway stations, subway stations, airports, and patient rooms. With the increase and renewal of monitored objects and property information related to such objects, it is imperative for the current interactive video system to realize convenient management, search, video man-machine interaction, and intelligent reprocessing of numerous video monitoring materials so as to bring the advantages of the network-based video monitoring system into full play.

FIG. 1 is a schematic view showing a dynamic video object descriptor (OD) that is used in the method for describing videos in the prior art. As shown in FIG. 1, a video OD is created for each object displayed in each frame, and is used for describing properties of the object such as shape, size, layer, duration, activity, activity parameters, and other features.

As described in the preceding solution, for a video sequence, each sequence number denotes a frame. A video OD is created for each project displayed in each frame, and is used for describing properties of the object such as contour coordinates, object numbering, size, layer, duration, activity, activity parameters, and other features. The video ODs form a video object description document on a frame-by-frame basis.

For example, if a dynamic object appears in n frames of images, n video ODs need to be created to denote the tracking relation; if m dynamic objects appear in n frames of images, m×n video ODs need to be created to denote the tracking relation. In each video OD, information about the object is recorded, including the contour coordinates of all pixels on the contour of the object, personal identification number (PID), size, layer, duration, activity, activity parameters, personal photos, personal parameters, and other features. To replay the video sequences, the system restores the mapping between the contour coordinates of each object and the video sequences from the video OD, thereby realizing man-machine interaction for video surveillance.

Moreover, in the technical solution of the prior art, a video OD is created for each object displayed in every frame, and every video OD is required to describe the features of the object. Therefore, if the video sequence is long or many video objects exist, the quantity and size of the video ODs used for describing video objects will increase significantly, thus slowing down the quick search of the video materials.

SUMMARY

A method and a device for describing and capturing video objects are provided in the embodiments of the present application to decrease the quantity of video ODs. This helps suit the application requirements for intelligent video interaction and accelerates the search of the video materials.

The technical solution provided in the embodiments of the present application is detailed as follows.

A method for describing video objects, including:
capturing video images and generating video sequences;
generating a video object tracking sequence (OTS) according to the video sequences; and
generating video ODs according to the generated video OTS and video sequences.

A method for capturing video objects is provided in an embodiment of the present application. This method includes:
replaying video objects, and obtaining a video object region identification number (RID) and a video object region tracking identification number (TID) corresponding to the tracked video objects according to the information carried in the obtained video OTS;
searching the PID and features of the tracked video objects according to the video OD, and tracking the video object RID corresponding to the video object TID in subsequent frames; and
obtaining consecutive video object region maps (ORMs) by matching the video object RIDs with the video sequences, and marking the video ORMs in real time.

A device for describing video objects is further provided in an embodiment of the present application. This device includes:
a video object capturing module, adapted to: capture video images, generate video sequences, and export the video sequences respectively to a video object tracking module and a video object analyzing module;
a video object tracking module, adapted to: generate the video OTS according to the received video sequences, and export the video OTS to the video object analyzing module; and
a video object analyzing module, adapted to: generate the video ODs according to the video OTS exported by the video object tracking module and the video sequences exported by the video object capturing module.

A device for capturing video objects is further provided in an embodiment of the present application. This device includes:
a replay control module, adapted to: replay video objects, receive video objects selected by the user, match the video objects with the video ORMs contained in the video OTS, and obtain the tracked video object RID; query the video object region index (ORI) according to the tracked video object RID to obtain the tracked video object TID, track the video object RID related to the video object TID in subsequent frames, and export the video object RID to a video overlay module;
the video overlay module, adapted to: match the video object RID contained in the received information with the video sequence to obtain consecutive video ORMs, mark the video ORMs in real time, and export the video ORMs to a displaying module; and
the displaying module, adapted to: display the marked video ORMs in real time.

In the preceding technical solution, video images are captured to generate video sequences, and then the video OTS is generated according to the video sequences. Later, video ODs are generated according to the generated video OTS and video sequences. As in the generated video OTS, the video object is captured and tracked according to the video object region TID, and no video OD needs to be created for each video object on a frame-by-frame basis. Therefore, the quantity of video ODs is reduced, thereby suiting the application requirements for the intelligent video interaction and accelerating the search of the video materials.

DETAILED DESCRIPTION OF THE EMBODIMENTS

Embodiments of the Device

A device for describing video objects is provided in an embodiment of the present application. This device includes: a video object capturing module, a video object tracking module, and a video object analyzing module.

The video object capturing module is adapted to capture video images, generate video sequences, and export the video sequences respectively to the video object tracking module and the video object analyzing module respectively.

The video object tracking module is adapted to generate a video OTS according to the received video sequences, and export the video OTS to the video object analyzing module.

The video object analyzing module is adapted to generate video ODs according to the video OTS exported by the video object tracking module and the video sequences exported by the video object capturing module.

Additionally, the device further includes a video object detecting module, adapted to: determine a video object RID and a video object region TID according to the received video sequences, and export the video object RID and the video object region TID to the video object tracking module.

Then, the video object tracking module determines the video object region TID according to the received video sequences, generates the corresponding video OTS according to the video object region TID and the received video object RID and video sequences, and then exports the generated video OTS to the video object analyzing module.

Preferably, the device may further include an event analyzing module, adapted to: receive the video sequences exported by the video object capturing module and the video ODs exported by the video object analyzing module, and generate a event description (ED), where the ED cites an object PID carried in the video ODs.

The technical solution of the present application is elaborated with reference to the following embodiments.

Figure 1:
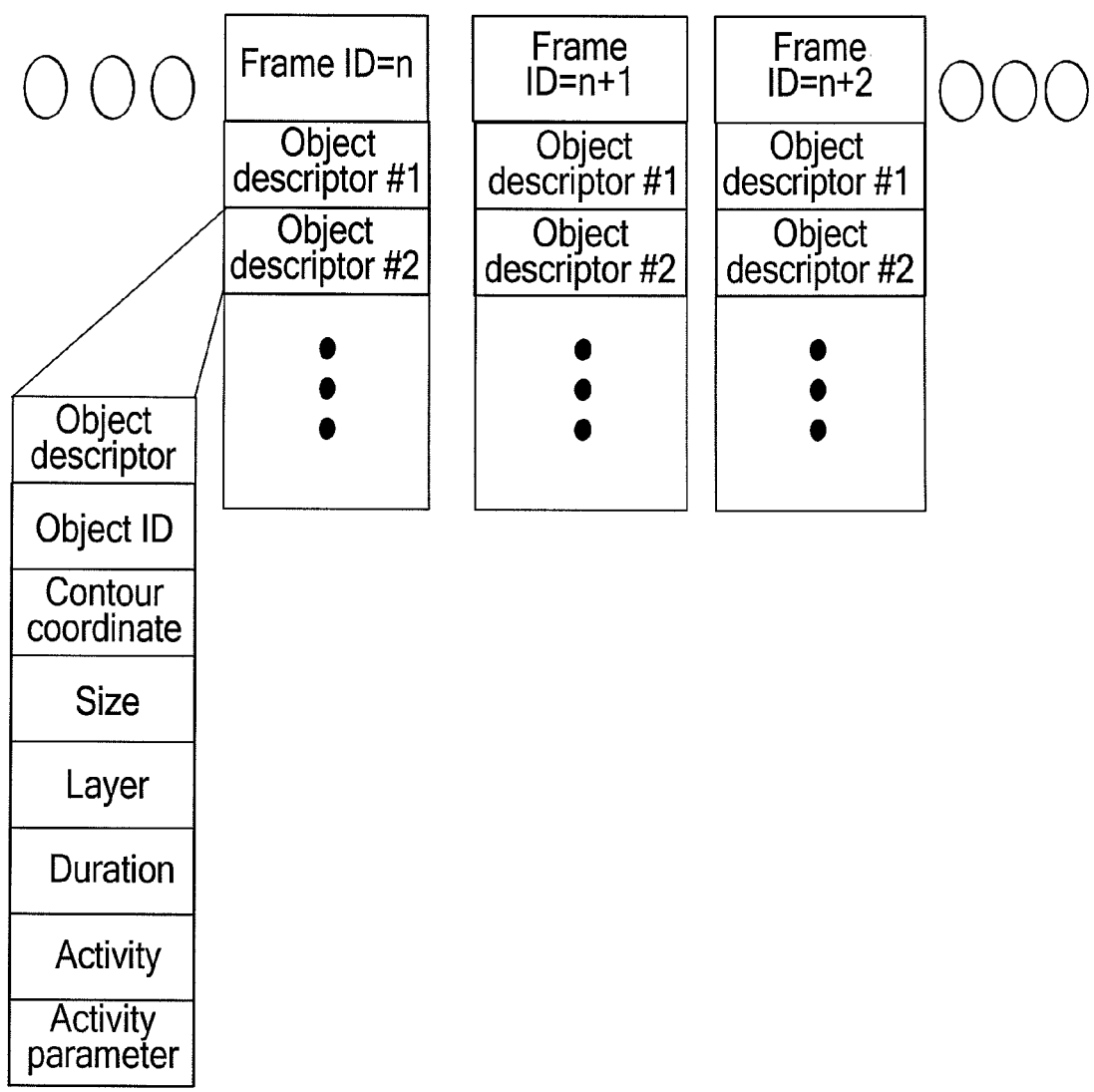
FIG. 1 is a schematic view showing an OD used for describing dynamic video objects in the prior art.
Figure 2:
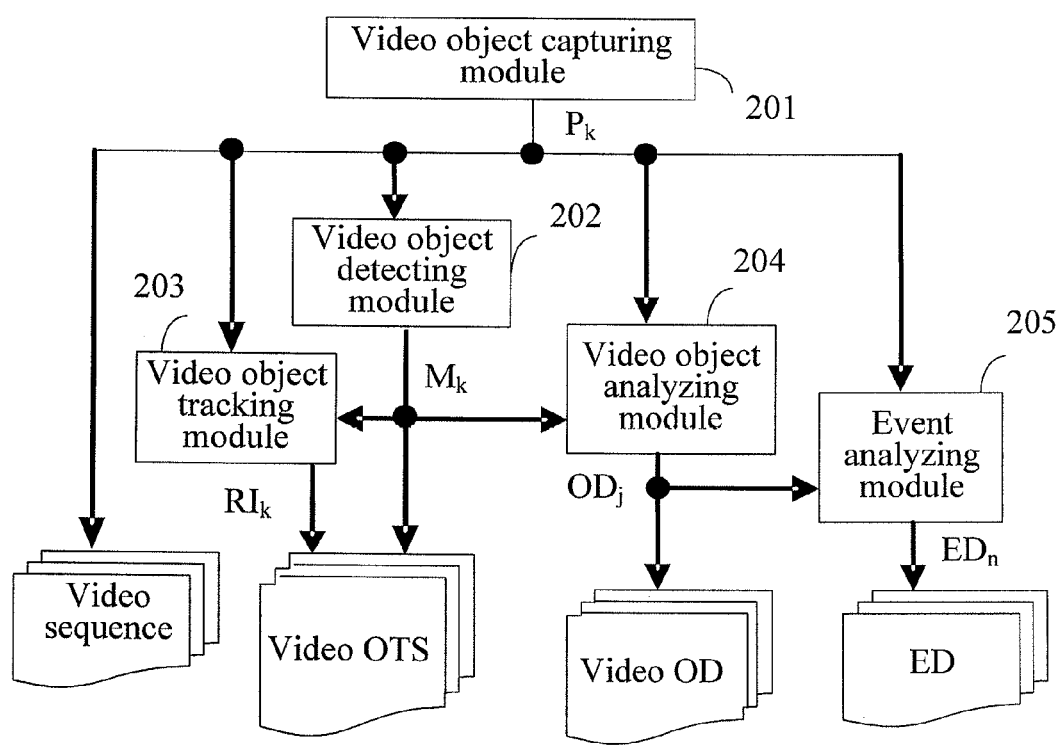
FIG. 2 shows a structure of an intelligent video generating device according to a first embodiment of the present application.

FIG. 2 shows a structure of the intelligent video generating device according to a first embodiment of the present application. The intelligent video generating device includes: a video object capturing module 201, a video object detecting module 202, a video object tracking module 203, a video object analyzing module 204, and an event analyzing module 205 respectively.

The video object capturing module 201 is adapted to: capture video images, generate the video sequence $P_k$ inclusive of k frame consecutive images, and export the video sequences respectively to the video object detecting module 202, video object tracking module 203, video object analyzing module 204, and event analyzing module 205.

The video object detecting module 202 is adapted to: receive the video sequence $P_k$ exported by the video object capturing module 201, obtain and detect the video ORM $M_k$, allocate the video object RIDs to different video objects in the detected $M_k$, and export the $M_k$ and the video object RID to the video object tracking module 203.

The following describes the method for obtaining RIDs and corresponding TIDs of different objects in the video ORMs by using the video object detecting module 202 as described in the first embodiment of the present application.

Figure 3:
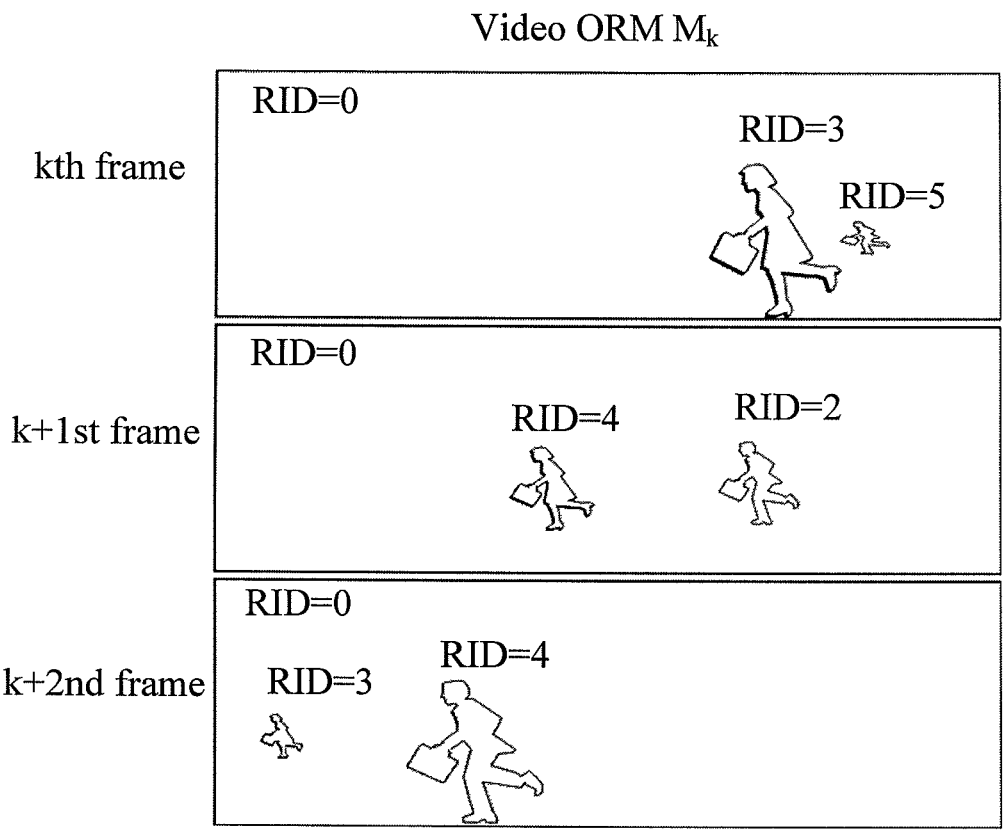
FIG. 3 shows a schematic diagram of generating different video object RIDs in the video ORM $M_k$ according to a second embodiment of the present application.

FIG. 3 shows a schematic diagram of generating different video object RIDs in the video ORM $M_k$ according to a second embodiment of the present application. As shown in FIG. 3, assuming that the video ORM $M_k$ includes three frame consecutive images, namely, $k^{th}$ frame image, $k+1^{st}$ frame image, and $k+2^{nd}$ frame image, each of which includes two video objects. In the $k^{th}$ frame image, when one video object is detected, the system allocates a non-zero RID to this video object. Different video object regions have different RIDs. The RID value of a region without any object is set to 0. The method for generating the video ORM is as follows:

$$M_k(x, y) = \begin{cases} 0 \\ j \end{cases}.$$

In this formula, (x, y) denotes the coordinates of $M_k$. When the (x, y) values are located in a background image, the value of $M_k(x,y)$ is 0; when the (x, y) values are located in a video object region, the value of $M_k(x,y)$ is j, where j denotes the allocated RID.

Taking FIG. 3 for an example. For the $k^{th}$ frame image, the system detects two video objects. For one video object, the allocated RID is 3, denoting that the RID value of the video object region is 3; for the other video object, the allocated RID is 5, denoting that the RID value of the video object region is 5. That is, different object regions are allocated with different RIDs. Moreover, the same video object in different frame images may be allocated with different RIDs.

In actual application, the value of a video object region may be different from the RID in the same $M_k$. For example, if the allocated RID is 2, the value of the corresponding video object region may be 3 or 4. Moreover, values in the same video object region may not be the same. Under such a condition, values of the corresponding video object region may be related to the RIDs through other manners.

Figure 4:
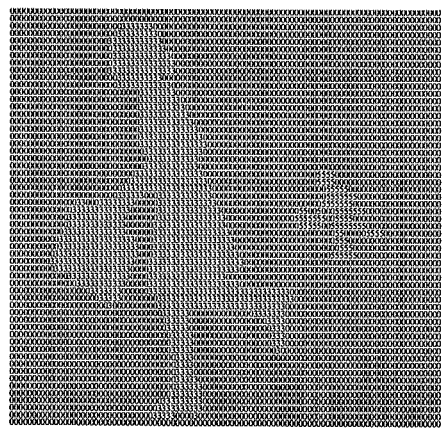
FIG. 4 shows a schematic diagram of part of the video ORM $M_k$ according to a third embodiment of the present application.

FIG. 4 shows a schematic diagram of part of the video ORM $M_k$ according to a third embodiment of the present application. As shown in FIG. 4, two video object regions are provided, with their RID values being respectively 3 and 5; other regions with the RID being 0 denotes the background image.

After the video ORM and video object regions are obtained, the window coordinates (Left, Bottom, Right, Top) and center coordinates (Center X, Center Y) of each video object region may be calculated by collecting and analyzing statistics of the video object regions. The algorithm is detailed as follows:

Left: minimum value of coordinates of points on the X-axis when the RID is j in $M_k$;

Bottom: minimum value of coordinates of points on the Y-axis when the RID is j in $M_k$;

Right: maximum value of coordinates of points on the X-axis when the RID is j in $M_k$;

Top: maximum value of coordinates of points on the Y-axis when the RID is j in $M_k$;

Center X: average value of coordinates of points on the X-axis when the RID is j in $M_k$; and Center Y: average value of coordinates of points on the Y-axis when the RID is j in $M_k$.

The video object tracking module 203 is adapted to: receive $M_k$ and RID exported by the video object detecting module 202 and $P_k$ exported by the video object capturing module 201; analyze the video content of different video object regions in frames to obtain the tracking relation between the video object regions; allocate the same video object region TID to the video object regions with the same tracking relation in different frames; allocate a new video object region TID to a new video object region; generate a video OTS $(M_k, RI_k)$, where $RI_k$ is the $k^{th}$ frame (k=0, 1, ..., and K−1) video ORI inclusive of the RID and TID; and export the video OTS to the video object analyzing module 204.

Still taking FIG. 3 for example. The TID with its value set to 2 is allocated to the RID with its value set to 3 in the $k^{th}$ frame image, the RID with its value set to 4 in the $k+1^{st}$ frame image, and the RID with its value set to 3 in the $k+2^{nd}$ frame image to denote the tracking relation therebetween. The TID with its value set to 3 is allocated to the RID with its value set to 5 in the $k^{th}$ frame image, the RID with its value set to 2 in the $k+1^{st}$ frame image, and the RID with its value set to 4 in the $k+2^{nd}$ frame image to denote the tracking relation therebetween.

It is assumed that: for the video object region with its RID set to 3 in the $k^{th}$ frame video image, the calculated window coordinates (Left, Bottom, Right, Top) and center coordinates (Center X, Center Y) are respectively (180, 2, 234, 56) and (210, 28), and for the video object region with its RID set to 5, the calculated window coordinates and center coordinates are respectively (235, 24, 255, 36) and (246, 29); for the video object region with its RID set to 4 in the $k+1^{st}$ frame video image, the calculated window coordinates and center coordinates are respectively (102, 11, 128, 38) and (116, 24), and for the video object region with its RID set to 2, the calculated window coordinates and center coordinates are respectively (190, 12, 215, 40) and (203, 25); for the video object region with its RID set to 3 in the $k+2^{nd}$ frame video image, the calculated window coordinates and center coordinates are respectively (27, 24, 46, 35) and (37, 28), and for the video object region with its RID set to 4, the calculated window coordinates and center coordinates are respectively (65, 3, 115, 58) and (92, 29). Then, the video ORI $RI_k$ in the video OTS $(M_k, RI_k)$ is shown in Table 1:

TABLE 1

|  |  | $RI_k$ | $RI_{k+1}$ | $RI_{k+2}$ |
|---|---|---|---|---|
| Record 1 | RID | 3 | 4 | 3 |
|  | TID | 2 | 2 | 2 |
|  | Window | (180, 2, 234, 56) | (102, 11, 128, 38) | (27, 24, 46, 35) |
|  | Center | (210, 28) | (116, 24) | (37, 28) |
| Record 2 | RID | 5 | 2 | 4 |
|  | TID | 3 | 3 | 3 |
|  | Window | (235, 24, 255, 36) | (190, 12, 215, 40) | (65, 3, 115, 58) |
|  | Center | (246, 29) | (203, 25) | (92, 29) |

The video object analyzing module 204 is adapted to: receive the video OTS $(M_k, RI_k)$ exported by the video object tracking module 203 and $P_k$ exported by the video object capturing module 201, and generate the video object descriptor $OD_j$ (j=0, 1, ..., J−1) inclusive of the video object PID and the video object classification number (CID) according to $P_k$ and $(M_k, RI_k)$, where J denotes the number of different video objects in K frame consecutive images.

Figure 5:
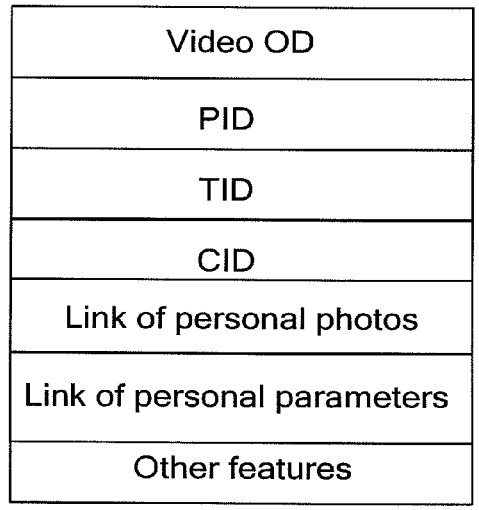
FIG. 5 shows a structure of a video OD according to a fourth embodiment of the present application.

FIG. 5 shows a structure of a video OD according to a fourth embodiment of the present application. As shown in FIG. 5, a video OD includes PIDs, TIDs, CIDs, links of personal photos, links of personal parameters, and other features. Both the PID and the TID are essential parameters in the video OD. The PID is the only ID that identifies the video object, denotes the identity of the video object, and may be cited by other semantic descriptions. The TID is a video object region tracking number in $(M_k, RI_k)$. The CID is the classification number of a video object, and may be cited by other semantic descriptions. The links of the personal photo and personal parameters may connect the personal photo and personal parameters to other locations to reduce the size of the video OD. Moreover, the video OTS may be compressed by using compression coding such as Huffman coding and then exported.

After the initial video OD is generated, the video object analyzing module 204 repeatedly analyzes features of the video object region, updates the features of a video object with higher credibility into the video OD if features (such as the ORM, contour map, personal photo, and personal parameter) of the video object in the video object region have higher credibility than the corresponding features in the video OD, and updates the linked photos and files corresponding to the personal photos and personal parameters in the OD.

The video object analyzing module 205 is adapted to: receive the result exported by the video object capturing module 201 and video object analyzing module 204, generate the video object event description $ED_n$ based on the semantic by analyzing the result exported by the video object detecting, video object tracking, video object analyzing, and video sequence, where the $ED_n$ is used to semantically describe the events happening in the video sequence, and may cite the PID in the $OD_j$.

Based on the above-mentioned device for describing video objects, a device for capturing video objects is further provided in an embodiment of the present application. This device includes:

a replay control module, adapted to: replay video objects, receive video objects selected by users, match the video objects with the video ORMs contained in the video OTS, and obtain the tracked video object RID; query the video ORI according to the tracked video object RID to obtain the tracked video object region TID, track the video object RID related to the video object region TID in subsequent frames, and export the video object RID to a video overlay module;

the video overlay module, adapted to: match the video object RID contained in the received information with the video sequence to obtain consecutive video ORMs, mark the video ORMs in real time, and export the video ORMs to a displaying module; and the displaying module, adapted to: display the marked video ORMs in real time.

Additionally, the device may further include a replay control/edit control module, adapted to edit the captured and tracked video objects.

The editing process includes: updating video object region TIDs in both video ORIs and video ODs manually or automatically; or updating the links of the personal photo and personal parameters, and other features in the video ODs manually or automatically; or editing EDs related to captured video objects manually.

The technical solution of the present application is further elaborated with reference to the following embodiments.

Figure 6:
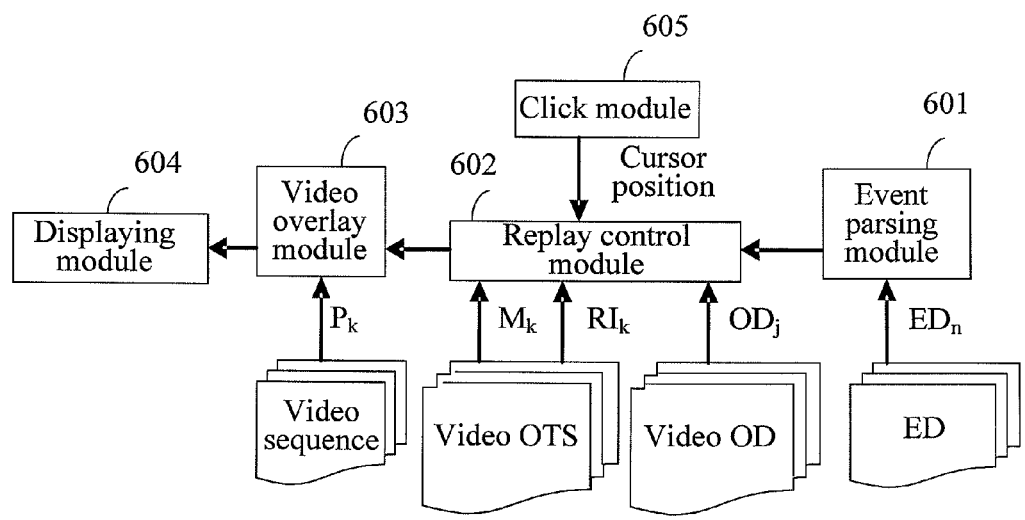
FIG. 6 shows a structure of an intelligent video replaying device according to a fifth embodiment of the present application.

FIG. 6 shows a structure of an intelligent video replaying device according to a fifth embodiment of the present application. As shown in FIG. 6, the intelligent video replaying device includes: an event parsing module 601, a replay control module 602, a video overlay module 603, a displaying module 604, and a click module 605.

The event parsing module 601 is adapted to: semantically describe events happening in video sequences, obtain PIDs corresponding to the related video objects through the $ED_n$ according to video objects described by the $ED_n$, and export PIDs to the replay control module 602.

The click module 605 is adapted to select and export the tracked video objects to the replay control module 602.

The replay control module 602 is adapted to: replay video objects; parse the video OTS ($M_k$, RIO simultaneously; receive the video object exported by the click module 605; match the video object with the $M_k$ in ($M_k$, $RI_k$); obtain the RID corresponding to the tracked video object if the video object is successfully matched with a specified video object region in $M_k$; query the $RI_k$ according to the RID to obtain the TID corresponding to the tracked video object; search the PID and features of the tracked video object through the $OD_j$; track the RID related to the TID in subsequent frames to capture and track video objects, and export information to the video overlay module 603; or adapted to: receive the PID exported by the event parsing module 601, determine the $OD_j$ of the video object according to the received PID, obtain the corresponding TID (one PID corresponds to one or more TIDs), search the $OD_j$ according to the obtained TID, and obtain other features of the tracked video object, such as personal photos, personal feature parameters, lower-layer features, and semantic description, and export information to the video overlay module 603; or adapted to: receive the PID exported by the event parsing module 601, determine the $OD_j$ of the video object according to the received PID, search the $OD_j$ to obtain the corresponding TID, obtain the $RI_k$ of the tracked video object through the TID, track the location and contour of the video object through the $RI_k$, and export information to the video overlay module 603.

The video overlay module 603 is adapted to: receive the information exported by the replay control module 602; match the RIDs contained in the exported information with video sequences to obtain consecutive video objects in $M_k$; mark the corresponding image region in real time and obtain personal photos according to the information exported by the replay control module 602; and export the operation result to the displaying module 604.

In actual application, the mark may be displayed through various manners. For example, the selected video object may be marked; or the contour of the selected video object may be marked; or the window coordinates of the object region of the selected video object may be marked; or the center coordinates of the object region of the selected video object may be marked; or the motion trail of the selected video object may be marked; or the video object may be tracked or marked according to the object PID cited by the ED; or one or more above-mentioned manners may be simultaneously used for marking.

The displaying module 604 is adapted to display the result exported by the video overlay module 603. For example, the personal photo of the selected and obtained video object is displayed by this module in real time.

In actual application, the replay control module, the video overlay module, and the displaying module may be added into the intelligent video generating device to replay and display the video objects, query and track the video objects in the video sequences, mark the corresponding image regions in real time, and display the obtained personal photos. The video ORM may be either a contour map or contour coordinates of an object.

Figure 7:
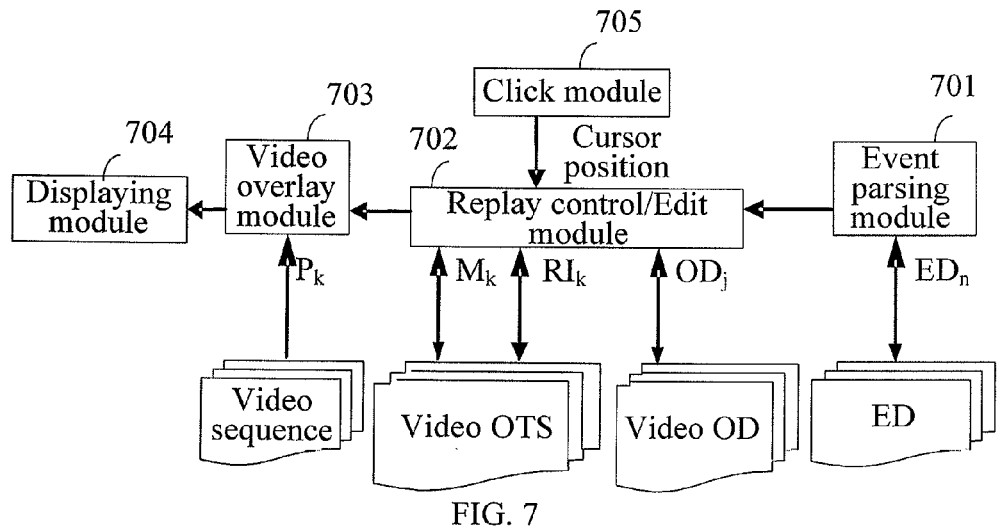
FIG. 7 shows a structure of an intelligent video editing device according to a sixth embodiment of the present application.

FIG. 7 shows a structure of an intelligent video editing device provided according to a sixth embodiment of the present application. As shown in FIG. 7, the intelligent video editing device includes: an event parsing module 701, a replay control/edit control module 702, a video overlay module 703, a displaying module 704, and a click module 705. Different from FIG. 6, the intelligent video editing device, based on the intelligent video replaying device, integrates an edit control function for editing and updating video objects and modifying the tracking relation between video objects as required by the user.

The replay control/edit control module 702 is adapted to: manually edit the ED related to the captured video object according to user's requirements exported by the click module 705, automatically or manually update TIDs in both the $RI_k$ and the $OD_j$ to modify the tracking relation between video objects, and automatically or manually update the links of personal photos and personal parameters and other features of video objects in the video object $OD_j$.

In actual application, either the intelligent video generating device and the intelligent video replaying device, or the intelligent video generating device and the intelligent video editing video may be integrated into a compound device. The new device is applicable to video surveillance, video conferences, industry, medical services, news, films, video cameras, video recorders, CD players, PC players, and so on. The coding format of the video image may be MPEG-1, MPEG-2, MPEG-4, H.263, H.264, WMV9, AVS, and JPEG. As long as the video images are consecutive, the video OTS be used to realize video interaction may be performed.

As described in preceding embodiments, all units are logically categorized according to their functions. Such categorization, however, is not limited to this mode, as long as the corresponding functions may be realized. Moreover, these functional units are named merely for differentiation, and therefore these names are not designed to limit the protection scope of the present application.

Embodiments of the Method

A method for describing a tracking sequence is provided in an embodiment of the present application. This method includes the following Blocks:

Block 001: Video images are captured to generate video sequences.

Block 002: A video OTS is generated according to the video sequences.

Specifically, this Block includes: determining the video object RIDs and video object region TIDs according to the generated video sequences, and generating the video OTS according to the video sequences, video object RIDs, and video object region TIDs.

The process of determining the video object RIDs according to the generated video sequences includes: obtaining video ORMs according to the video sequences, and numbering different video object regions in the video ORMs.

Additionally, the process of determining the video object region TIDs according to the generated video sequences includes: obtaining the video ORMs according to the video sequences, analyzing the video content of different object regions to obtain the tracking relation between the object regions, and allocating the same video object region TID to the object regions with the same tracking relation in different frames.

The above-mentioned video OTS may be the video ORM and the video ORI, where the video ORI may include the video object RID and the video object region TID, and the video ORM may include the contour maps or contour coordinates of the video object.

In actual application, the preceding video ORI may further include the window coordinates and center coordinates of the object region.

Block 003: The video ODs are generated according to the generated video OTS and video sequences.

In this Block, the video OD may include the links of the video object PID and video object region TID, where the video object region TID is linked with the dynamic property of the video object.

In actual application, the video OD may further include the links of the personal photo or personal parameters. Under such a circumstance, the specific implementation method includes: according to the quality of the photo of the tracked object obtained in the current frame, when the quality of the photo of the tracked object in the current frame is determined to be better than the quality of the photo corresponding to the links of the personal photo or personal parameters, using the photo of the tracked object in the current frame to update the photo corresponding to the links of the personal photo or personal parameters.

The process of using the photo of the tracked object in the current frame to update the photo corresponding to the links of the personal photo or personal parameters includes: updating files corresponding to the link of the personal photo or personal parameters of the tracked object.

In actual application, in addition to the preceding Blocks, the ED may also be generated according to the video ODs and video sequences, where the ED cites the object PID in the video ODs.

Based on the preceding method for describing the tracking sequence, a method for capturing video objects is further provided in an embodiment of the present application. This method includes the following Blocks:

Block 004: The video objects are replayed.

Block 005: The video object RID and video object region TID corresponding to the tracked video object are obtained according to the information carried in the obtained video OTS.

Specifically, this Block includes: matching the video objects clicked by the user with the video ORM contained in the video OTS, obtaining the video object RID corresponding to the tracked video object when the video object is determined to match a certain video object region in the video ORM, querying the video ORI according to the video object RID, and obtaining the video object TID corresponding to the tracked video object.

Block 006: The PID and features of the tracked video object are searched according to the video OD, and the video object RID in subsequent frames corresponding to the video object TID is tracked.

Block 007: A consecutive video ORM is obtained by matching the video object RIDs with the video sequences, and marked in real time.

The preceding marking mode includes marking of one of the following elements or any combination thereof: contour of the video object, window coordinates of the object region of the video object, center coordinates of the object region of the video object, and motion trail of the video object.

In actual application, in addition to the preceding Blocks, the personal photos may be selected, obtained, and then displayed in real time; or the object PID cited by the ED may be used to track and mark the video objects.

Additionally, the captured and tracked video objects may be edited. The process of editing include: updating video object TIDs in both the video ORIs and video ODs manually or automatically; or updating the links of the personal photo and personal parameters, and other features in video ODs manually or automatically; or editing EDs related to the captured objects manually.

The technical solution of the present application is further elaborated with reference to the following embodiments.

Figure 8:
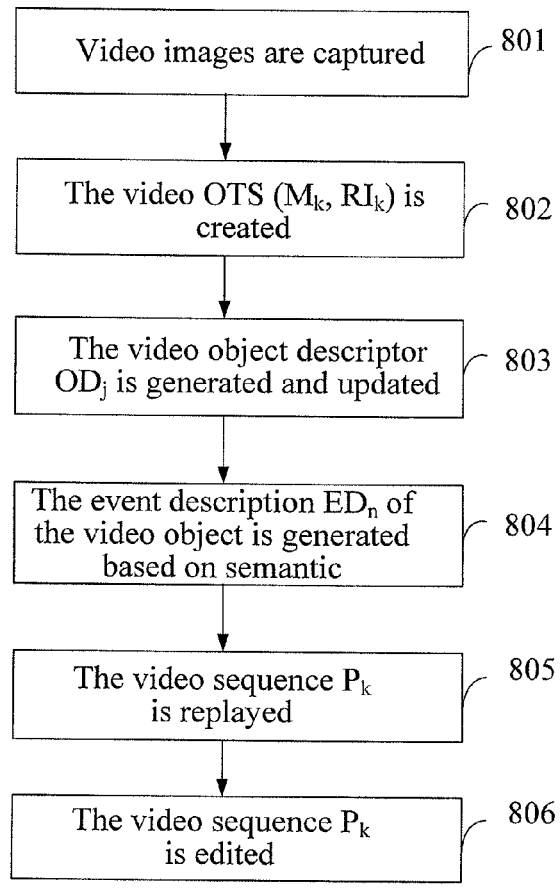
FIG. 8 shows a flowchart of a method for describing video objects according to a seventh embodiment of the present application.

FIG. 8 is a flowchart of a method for describing video objects provided according to a seventh embodiment of the present application. As shown in FIG. 8, the method includes the following Blocks:

Block 801: Video images are captured.

In this Block, captured K frame consecutive images, are used as a video sequence $P_k$.

Block 802: The video OTS ($M_k$, $RI_k$) is generated.

In this Block, the video ORM $M_k$ is obtained according to the video sequence $P_k$ and then detected, RIDs are allocated to different video objects detected in the $M_k$, and window coordinates (Left, Bottom, Right, Top) and center coordinates (Center X, Center Y) of each RID are obtained according to the $M_k$ and the RID when the value of the video object region is equal to the RID in the same $M_k$; the same TID is allocated to the video object regions with the tracking relation in different frames; a new TID is allocated to a new object region; and $RI_k$ is generated according to the RID, TID, window coordinates, and center coordinates.

In actual application, the value of a video object region may be different from the RID in the same $M_k$. For example, if the value of the allocated RID is 2, the value of the corresponding video object region may be set to 3 or 4. Moreover, values in the same object region may not be the same. In this case, relation between values of the corresponding video object regions and the RID may be established through other manners.

Additionally, the video ORM $M_k$ may be a contour map of the video object, or contour coordinates of the video object, or the compressed video ORM, contour map of the video object, and contour coordinates of the video object.

The generated ($M_k$, $RI_k$) is compatible with the existing video code streams such as MPEG-1, MPEG-2, MPEG-4, and H.264, and with the video OD of MPEG-7. Therefore, the ($M_k$, $RI_k$) may be saved with related video code streams and description elements of MPEG-7, or saved separately.

Additionally, the generated $RI_k$ may merely contain the TID and RID.

Block 803: The video object descriptor $OD_j$ is generated and updated according to the Pk and generated $(M_k, RI_k)$.

In this Block, the features of the video object region is analyzed according to the $P_k$ and generated $(M_k, RI_k)$. If features of images in the object region have higher credibility than features of images in the object region in the video OD, the features with higher credibility are updated into the video OD, and the best personal photo is updated into the corresponding description link file. In this embodiment, the personal photos and personal parameters in the video OD are saved into other files through links, thus reducing the size of the video OD.

Block 804: The video object event description $ED_n$ is generated based on the semantic according to the $P_k$, $(M_k, RI_k)$, and $OD_j$.

In this Block, the $ED_n$ may semantically describe events happening in the video sequences, and cite the PID in the $OD_j$.

Block 805: The video sequence $P_k$ is replayed.

In this Block, the video sequence $P_k$ is replayed; the $(M_k, RI_k)$ is parsed simultaneously; the image selected by the user is matched with the $M_k$; if the image is successfully matched with a video object region in the $M_k$, the video object RID is obtained; the video object $RI_k$ is queried to obtain the video object TID; and the video object PID and object features are searched through the $OD_j$ to capture and track the video object; or the $ED_n$ is parsed; the $OD_j$ is searched according to the PID cited by the $ED_n$ to obtain the corresponding TID; and the RID is obtained by querying the $RI_k$.

Block 806: The video sequence $P_k$ is edited.

In this Block, the TIDs in both $RI_k$ and $OD_j$ are updated automatically or manually as required by users to update the tracking relation among video objects; personal photos, personal parameters, and other features of the video object are updated automatically or manually; the ED related to the captured video object is edited manually; the marks, photos, and tracking relation of the captured and tracked video objects are displayed as required by users.

Additionally, it is understandable for those skilled in the art that all or part of the methods provided in any embodiment of the present application may be performed through related hardware instructed by programs. For example, these Blocks may be implemented by computer programs. Such programs may be saved in readable storage medium such as random access memory (RAM), disks, and optical disks.

In the embodiments of the present application as described above, for consecutive dynamic video objects, it is unnecessary to create a video OD for each video object on a frame-by-frame basis, thereby reducing the quantity of video ODs. Moreover, the personal photo and personal parameters in the video OD are saved into other files through links, thereby reducing the size of the video OD. This helps suit the application requirements for intelligent video interaction and accelerate the search of the video materials.

Elaborated above are some exemplary embodiments which elaborate the objectives, technical solution, and benefits of the present application. It should be understandable that the claims are not limited to these embodiments. Any modification, equivalent replacement, and improvement made without departing from the spirit and principle of the present application shall fall within the scope of the claims.

What is claimed is:

1. A method for capturing video objects, comprising:
   replaying video objects;
   obtaining a video object region identification number (RID) and a video object region tracking number (TID) corresponding to a tracked video object according to information carried in an obtained video object tracking sequence $(M_k, RI_k)$, OTS, where $M_k$ is video object region maps (ORMs), $RI_k$ is the $k^{th}$ frame video object region index inclusive of the RID and TID; and video object regions with same tracking relation in different frames have same TID;
   searching a personal identification number (PID) and features of the tracked video object according to a video object descriptor (OD);
   tracking the video object RID corresponding to the video object region TID in subsequent frames; and
   obtaining consecutive video object region maps (ORMs) by matching the video object RID with video sequences, and marking the video ORMs in real time.

2. The method according to claim 1, wherein the obtaining of the video object RID and the video object region TID corresponding to the tracked video object according to the information carried in the obtained video OTS comprises:
   matching the video object clicked by a user with the video ORMs contained in the video OTS;
   obtaining the video object RID corresponding to the tracked video object when the video object is determined to be matched with a specified video object region in the video ORMs; and
   querying a video object region index (ORI) according to the video object RID, and obtaining the video object region TID corresponding to the tracked video object.

3. The method according to claim 2, wherein the tracking of the video object further comprises: marking one or more elements of the group of elements consisting of: a contour of the video object, window coordinates of an object region of the video object, center coordinates of the specified object region of the video object, and a motion trail of the video object.

4. The method according to claim 1, further comprising:
   displaying personal photos of selected and obtained video objects in real time.

5. The method according to claim 1, further comprising:
   tracking or marking the video object by using the PID cited by an event description (ED).

6. The method according to claim 2, further comprising:
   editing the tracked video object; and
   updating the video object region TID in both the video ORIs and the video OD.

7. The method according to claim 2, further comprising:
   editing the tracked video object; and
   updating links of personal photos, links of personal parameters, and other features in the video OD.

8. The method according to claim 2, further comprising:
   editing the tracked video object; and
   editing event descriptions (EDs) related to the captured video objects manually.

9. A device for capturing video objects, comprising:
   a replay control module, adapted to: replay video objects, receive video objects selected by a user, match the video objects with video object region maps (ORMs) contained in a video object tracking sequence $(M_k, RI_k)$, OTS, where $M_k$ is a video object region maps (ORMs), $RI_k$ is the $k^{th}$ frame video object region index inclusive of the RID and TID; and video object regions with same tracking relation in different frames have same TID, and obtain a tracked video object region identification number (RID); query a video object region index (ORI) according to the tracked video object RID to obtain a tracked video object region tracking number (TID), track the video object RID related to the video object region TID in subsequent frames, and export the video object RID to a video overlay module;

the video overlay module, adapted to: match the video object RID contained in received information with video sequences to obtain consecutive video ORMs, mark the video ORMs in real time, and export the video ORMs to a displaying module; and the displaying module, adapted to: display the marked video ORMs in real time.

10. The device according to claim 9, further comprising:

a replay control/edit control module, adapted to: edit video objects that are captured and tracked, wherein the replay control/edit control module updates the video object region TIDs in both the video ORIs and video object descriptors (ODs).

11. The device according to claim 9, further comprising:

a replay control/edit control module, adapted to: edit video objects that are captured and tracked, wherein the replay control/edit control module updates links of personal photos, links of personal parameters, and other features in the video ODs.

12. The device according to claim 9, further comprising:

a replay control/edit control module, adapted to: edit video objects that are captured and tracked, wherein the replay control/edit control module edits event descriptions (EDs) related to the captured video objects manually.

* * * * *